United States Patent [19]
Dalla Torre

[11] Patent Number: 5,886,087
[45] Date of Patent: Mar. 23, 1999

[54] TRANSPARENT, COLORLESS, AMORPHOUS POLYAMIDES AND MOLDED ARTICLES

[75] Inventor: Hans Dalla Torre, Domat/EMS, Switzerland

[73] Assignee: EMS-Inventa AG, Zürich, Switzerland

[21] Appl. No.: 936,808

[22] Filed: Sep. 24, 1997

Related U.S. Application Data

[63] Continuation-in-part of Ser. No. 555,790, Nov. 9, 1995, Pat. No. 5,696,202.

[30] Foreign Application Priority Data

Feb. 1, 1995 [CH] Switzerland ........................... 00270/95
Sep. 19, 1995 [EP] European Pat. Off. .............. 95114719

[51] Int. Cl.⁶ ..................................................... C08L 77/00
[52] U.S. Cl. ........................... 524/538; 525/66; 525/179; 525/432
[58] Field of Search .............................. 525/432; 524/538

[56] References Cited

U.S. PATENT DOCUMENTS

| | | |
|---|---|---|
| 2,512,606 | 6/1950 | Bolton et al. . |
| 2,696,482 | 12/1954 | Pease . |
| 3,597,400 | 8/1971 | Kashiro et al. . |
| 4,207,411 | 6/1980 | Shue ......................................... 528/338 |
| 4,369,305 | 1/1983 | Pagilagan ................................ 528/338 |
| 4,847,356 | 7/1989 | Hoppe et al. ........................... 528/346 |
| 5,310,860 | 5/1994 | Maj et al. ................................ 528/346 |
| 5,321,119 | 6/1994 | Torre et al. ............................. 528/338 |
| 5,360,891 | 11/1994 | Wenzel et al. ......................... 528/335 |

FOREIGN PATENT DOCUMENTS

| | | |
|---|---|---|
| 0 050 742 A1 | 5/1982 | European Pat. Off. . |
| 0 069 700 A1 | 1/1983 | European Pat. Off. . |
| 628602 | 12/1994 | European Pat. Off. . |
| 15 95 354 C3 | 10/1966 | Germany . |
| 2 034 541 | 7/1970 | Germany . |
| 37 17 928 A1 | 5/1987 | Germany . |
| 37 28 344 A1 | 8/1987 | Germany . |
| 43 10 970 A1 | 4/1993 | Germany . |

*Primary Examiner*—Ana Woodward
*Attorney, Agent, or Firm*—Browdy and Neimark

[57] ABSTRACT

Colorless, amorphous polyamides, preferably their blends or alloys, and the molded articles with high alternate bending strengths that can be produced from them, are made available; they are made up from unbranched long chain monomer units and cycloaliphatic monomer units, and have high strength, high rigidity, high heat distortion, and good solvent resistance.

18 Claims, No Drawings

TRANSPARENT, COLORLESS, AMORPHOUS POLYAMIDES AND MOLDED ARTICLES

This is a CIP of parent application Ser. No. 08 555,790, filed Nov. 09, 1995 U.S. Pat. No. 5,696,202.

Priority is claimed from the priority applications of the parent application of Feb. 01, 1995 and Sep. 19, 1995.

The subject of the present invention is transparent, colorless and amorphous polyamides and blends or alloys thereof with homopolyamides, and the molded articles that can be made thereof, which have high tenacity, good solvent resistance, and at the same time high rigidity and a high heat distortion temperature and high fatigue resistance strengths to alternating bending, and which in contrast to the prior art are colorless.

In European Patents EP 50 742 and EP 69 700 and U.S. Pat. Nos. 2,696,482, 3,597,400, 4,207,411 and 4,369,305, amorphous polyamides of aliphatic diamines and/or 4,4'-diaminodicyclohexylmethane (PACM) and aromatic dicarboxylic acids are described, but they have inadequate tenacity and transparency and are not colorless.

The polyamides of U.S. Pat. No. 2,512,606 and published German Patent Disclosure Application DE-OS 20 34 541 of aliphatic dicarboxylic acids add unsubstituted cycloaliphatic diamines with a high proportion of trans-trans-isomer are inadequately resistant to stress cracking in boiling water and alcohols, and in some cases are cloudy. Finally, the polyamides described in German Patent Disclosure DE 43 10 970 require an especially high proportion of trans-trans-isomer of from 35 to 60% of the 4,4'-diaminodicyclohexylmethane, which is attained only by means of special reaction conditions With expensive distillative fractionation in the production of the diamine. This makes these diamines not inconsiderably more expensive. They were commercially available under the tradenames PACM50$^R$ (DuPont, Wilmington, Del.) and Wondamin$^R$ (New Japan Chemical Corporation, Osaka). Dicycan$^R$ (BASF), an unsubstituted bis(4-aminocyclohexyl)methane, has similar high trans-trans-isomer proportions. Although these diamines do bring about satisfactory tenacity of the polyamide, nevertheless the resistance to alternate bending stress and the dimensional stability under temperature of the shaped articles made from them is inadequate for certain applications, such as filter bowls in a relatively high temperature range.

German Patent Disclosure DE 15 95 354 describes a process for preparing crystal-clear polyamides from dicarboxylic acids and a defined isomer mixture of bis(aminocyclohexyl)-propane, which can contain up to 80% caprolactam. The later "clouding" of those polyamides that contain dodecanedioic acid as the dicarboxylic acid is expressly mentioned.

German Patent Disclosure DE 37 17 928 covers transparent copolyamides of preferably aromatic dicarboxylic acids containing the isomers, no longer available today, of bis(4-amino-3-methyl-5-ethylcyclohexyl)methane, which have insufficiently high Tg values, and German Patent Disclosure DE 37 28 334 claims blends, with modified impact strength, of copolyamides of aromatic dicarboxylic acids and a mixture of hexamethylene diamine and PACM, which again have likewise low Tg values.

The object was accordingly to furnish polyamide molding compositions that make it possible to overcome the disadvantages of the prior art.

This object is attained by the transparent, colorless and amorphous polyamides, and their blends or alloys, characterized in that the polyamides are made up substantially of (a) at least one cycloaliphatic diamine having from 14 to 22 carbon atoms and at least one unbranched aliphatic dicarboxylic, acid having 8 to 14 carbon atoms, which can be replaced by a maximum of 20 mol % of at least one aromatic dicarboxylic acid, or (b) at least one unbranched aliphatic diamine having from 8 to 14 carbon atoms and at least one cycloaliphatic dicarboxylic acid having from 8 to 36 carbon atoms, which can be replaced by a maximum of 20 mol % of at least one aromatic dicarboxylic acid, wherein said polyamides or the blends or alloys thereof optionally contain processing and/or usage dictated activities, and wherein said further polyamides are selected from the group consisting of homopolyamides and/or transparent copolyamides, and by the molded articles that can be made thereof.

In particular, it is attained by polyamides, as well as blends and alloys, of at least one further polyamide with these amorphous polyamides, in which preferably unbranched long-chain aliphatic monomer units are combined with cycloaliphatic monomer units having at least one cyclohexane ring, and which as a result of this combination shows extremely high alternating bending strengths and at the same time high tenacity, high rigidity, high heat distortion under temperature and good solvent resistance.

Both a) alkyl-substituted cycloaliphatic diamines, preferably those with from 14 to 22 carbon atoms, can be combined with long-chain aliphatic dicarboxylic acids that have from 8 to 14 carbon atoms and preferably 8 to 12 carbon atoms, which in special cases can be replaced with small proportions of aromatic dicarboxylic acids, preferably a maximum of 20 mol % and especially preferably a maximum of 10 mol % thereof, and also b) long-chain unbranched aliphatic diamines, preferably those with from 8 to 14 carbon atoms, can be combined with cycloaliphatic dicarboxylic acids that have at least 8 to 36 carbon atoms.

These acids can be replaced with a maximum of 20 mol %, and preferably a maximum of 10 mol %, of at least one aromatic dicarboxylic aid.

The term alkyl-substituted cycloaliphatic diamines is understood to mean those that have one or more alkyl substituents, such as methyl, ethyl, propyl and isobutyl radicals, on at least one cyclohexane ring. The term cycloaliphatic dicarboxylic acids is understood to mean those that have one or more cyclohexane rings.

Surprisingly, it has been found that especially the transparent polyamides of octanedioic acid, nonanedioic acid, decanedioic, undecanedioic acid or dodecanedioic acid and a commercially available isomer mixture of the 3,3'-dimethyl-4,4'-diaminodicyclohexylalkane type with one to three C-atoms, and in particular 3,3'-dimethyl-4,4'-diaminodicyclohexylmethane type or -in another expression bis-(3-methyl-4-aminocyclohexyl)methane, namely Laromin C$_{260}$$^R$ (BASF), alone or in blends, alloys or as mixtures with homopolyamides, are suitable for molded articles that are highly ductile, extraordinarily resistant to alternate bending and nevertheless rigid, having a high heat distortion and are resistant to stress cracking in alcohol, ketones and hot water.

Another preferred embodiment is the combination of decane diamine or dodecane diamine with a cycloaliphatic dicarboxylic acid, preferred with 1,4-cyclohexane dicarboxylic acids for the polyamides according to the invention.

The replacing aromatic dicarboxylic acids are isophthalic acid, terephthalic acid and 2,6-naphthalene dicarboxylic acid.

The polyamides according to the invention may be prepared by processes of the prior art under pressure in autoclaves or in reaction extruders at temperatures that are preferably above 260° C.

The blends or alloys with homopolyamides are prepared by the usual processes known from the prior art.

The further polyamides comprises homopolyamides as well as copolyamides in an amount up to 60% by weight.

The further homopolyamides advantageously used for this purpose are preferably chosen from the group comprising PA 69, PA 610, PA 612, PA 912, PA 1212, PA 11, PA 12, PA MACM12, PA MACMI, PA MACMT, PA PACM12, PA PACMI, PA PACMT, PA PACP12, PA PACPI, PA PACPT; PA IPD12, PA IPDT, PA BN 12 and PA TCD12.

The further amorphous copolyamides are chosen from the group comprising PA 12/MACMI, PA 12/MACMI/MACMT, PA 12/PACMI, PA 12/PACPI, PA 12/TCDI, PA 12/IPDI and PA 12/BNI.

Polyamides, blends and alloys can optionally contain additives, preferably from the group of lubricants, UV and heat stabilizers, chain regulators, pigments, colorants, impact strength modifiers, flame retardants and reinforcing agents; among the latter, glass, minerals, fibers and fillers are preferred.

The invention also encompasses molded articles that can be made from the polyamides, blends or alloys according to the invention.

The molded articles according to the invention are distinguished not only by very high alternate bending strengths, which are documented by at least 1,000,000 alternate bending cycles (measured at 23° C. with dry test bars, 4 mm thick, in accordance with DIN 53442), but also at the same time by high impact strengths, high Tg values of more than 175° C. and excellent resistance to stress cracking in the most solvents. These very favorable product properties are inherent to said polymer blends and alloys and can only partially be assigned to the high molecular weighs and the viscosities of higher than 1.5 (measured in a 0.5 concentration in m-cresol).

The following examples are intended to explain but not to limit the concept of the invention.

EXAMPLE 1

Via a heated receiving vessel, 13,800 g of decane dicarboxylic acid, 14,590 g of Laromin $C_{260}^R$ [bis-(3-methyl-4-aminocyclohexyl)methane], 30 g of 50% aqueous $H_3PO_2$, 150 g of benzoic acid, and 10 l of water were placed in a pressure autoclave with a 130 l capacity, and stirred until homogeneous.

After a compression, decompression and degassing phase, the polyamide was pressed out as a strand, passed under cold water and granulated. The dried granulate had the following properties:

| granulate evaluation | | colorless brilliant transparent |
|---|---|---|
| eta relative | 0.5% m-cresol | 1.71 |
| melt viscosity at 270° C./122.6 N | (Pa · s) | 986 |
| Tg | (°C.) | 157.1 |
| cold crystallization point | (°C.) | no peaks in the melt |
| melting point | (°C.) | no peaks in the melt |
| terminal groups $NH_2$/COOH | ($\mu$ equiv/g) | 51/34 |
| $H_2O$ content | (weight %) | 0.010 |

Test bars were made from the granulate by injection molding: Thereby the test bars: showed the following mechanical properties:

| impact strength, dry 23° C./–40° C. | (kJ/m$^2$) | nb/nb (no break) |
|---|---|---|
| notched impact strength, dry 23° C./–40° C. | (kJ/m$^2$) | 12/10 |
| tensile strength at break, dry/conditioned 23° C. | (N/mm$^2$) | 48/45 |
| elongation at break, dry/conditioned 23° C. | (%) | 79/86 |
| tensile E-modulus, dry/conditioned 23° C. | (N/mm$^2$) | 1640/1640 |

Number of load change cycles per DIN 53442, dry, 23° C., using bars 4 mm thick, in a C. Schenk alternate load testing apparatus, type PWO 150/1966: 1,960,000

Stress cracking strength in methanol, acetone, ethyl acetate, toluene: no stress cracking Small DIN bars were placed in boiling water for 5 months; the test specimens remained transparent, showed no deformation at all, and retained 80% of the original notched impact strength.

EXAMPLE 2 (Comparison example)

In the same manner as in example 1, via a receiving vessel, 13,800 g of dodecane dicarboxylic acid, 12,870 g of a bis-(4-aminocyclohexyl)methane (PACM ), with a high trans/trans content, 30 g of 50% aqueous hypophosphorous acid, 150 g of benzoic acid and 10 l of water were placed into a reaction vessel and stirred to make a homogeneous mixture.

After an identical polycondensation reaction to that of Example 1, a transparent strand, which however was cloudy by a slight haze, was extracted and granulated.

The granulate properties were as follows:

| granulate evaluation | | transparent with a clouding haze |
|---|---|---|
| eta relative viscosity | (0.5%, m-cresol) | 1.68 |
| melt viscosity at 270° C./122.6 N | (Pa · s) | 648 |
| Tg | (°C.) | 139.9 |
| cold crystallization point | (°C.) | 173.5 |
| melting point | (°C.) | 252.7 |
| terminal groups $NH_2$/COOH | ($\mu$ equiv/g) | 50/112 |
| $H_2O$ content | (weight %) | 0.015 |

The injection molded test specimens had the following mechanical values:

| impact strength, dry 23° C./–40° C. | (kJ/m$^2$) | nb/nb (=no break) |
|---|---|---|
| notched impact strength, dry 23° C/–40° C. | (kJ/m$^2$) | 1.6/0.7 |
| tensile strength at break, dry/conditioned 23° C. | (N/mm$^2$) | 41 |
| elongation at break, dry/conditioned | (%) | 36 |
| tensile E-modulus, dry/conditioned 23° C. | (N/mm$^2$) | 1560/1630 |

Number of load change cycles per DIN 53442, dry, 23° C., using bars 4 mm thick, in a C. Schenk alternate load testing apparatus, type PWO 150/1966: 328,600

Stress cracking strength in methanol, acetone, ethyl acetate, toluene: incipient stress cracking As in Example 1, small DIN bars were placed in boiling water for 5 months; the bars became cloudy, were deformed, and has a notch impact strength that was reduced by more than 50% in comparison with the initial value.

EXAMPLE 3

A mixture of pellets of 70 weight % of a transparent polyamide made up from bis-(3-methyl4-amino-cyclohexyl)

methane and dodecanedioic according to example 1 and 30 weight % of a transparent copolyamide made up from 33.5 mole % of lactam 12 and 65.5 mole % of acid bis-(3-methyl-4-amino-cyclohexyl)methane and isophthalic acid was compounded with 0.5 weight % of Irganox B1171 at 285° C. in a Werner Pfleiderer ZSK30- unit (100 rpm).

A transparent strand was cooled and pelletized.

Transparent test bars formed by injection molding had the following properties:

| granulate evaluation | | transparent with a clouding haze |
|---|---|---|
| eta relative viscosity | (0.5%, m-cresol) | 1.67 |
| glass transition temperature (Tg)/DSC | (°C.) | 165 |
| impact strength, dry 23° C./DIN 53453 | (kJ/m$^2$) | nb (no break) |
| notched impact strength, dry 23° C./DIN 53453 | (kJ/m$^2$) | 8 |
| tensile strength at break, dry 23° C./DIN 53455 | (N/mm$^2$) | 60 |
| elongation at break, dry 23° C./DIN 53545 | (%) | 70 |
| tensile E-modulus, dry 23° C./DIN 53455 | (N/mm$^2$) | 1780 |
| alternate bending strength, dry 23° C./DIN 53442 | (cycles) | 1'200'000 |

EXAMPLE 4

A mixture of pellets of 50 weigh % of the transparent polyamide made up from bis-(3-methyl4-amino-cyclohexyl)methane and dodecanedioic acid according to example 1 and 50 weight % of Grilamide L25 (EMS CHEMIEVAG, Zurich, Switzerland ) a PA 12-type having a eta relative viscosity of 2,5 (1.0% in sulfuric acid) was compounded at 280° C. in a Werner Pfleiderer ZSK30-unit (100 rpm).

A transparent strand was cooled and pelletized.

The granulate properties were as follows:

| granulate evaluation | | transparent, clear |
|---|---|---|
| eta relative viscosity | (0.5%, m-cresol) | 1.92 |
| melt viscosity at 270° C./122.6 N | (Pa · s) | 180 |
| glass transition temperature (Tg)/DSC | (°C.) | 118 |
| impact strength, dry 23° C./DIN 53453 | (kJ/m$^2$) | nb (=no break) |
| notched impact strength, dry 23° C./DIN 53453 | (kJ/m$^2$) | 8.2 |
| tensile strength at break, dry 23° C./DIN 53455 | (N/mm$^2$) | 50 |
| elongation at break, dry 23° C./DIN 53545 | (%) | 230 |
| tensile E-modulus, dry 23° C./DIN 53455 | (N/mm$^2$) | 1420 |
| alternate bending strength, dry 23° C./DIN 53442 | (cycles) | 1'400'000 |

I claim:
1. A blend or alloy of polyamides, comprising:
   (1) a transparent colorless amorphous homopolyamide having a relative solution viscosity of higher than 1.5 (0.5% in m-cresol) consisting essentially of at least one cycloaliphatic diamine having from 14 to 22 carbon atoms and at least one unbranched aliphatic dicarboxylic acid having 8 to 14 carbon atoms;
   (2) at least one transparent copolyamide in an amount of up to 60% by weight based on the total weight of polyamide; and
   (3) at least one optional additive;
   wherein standardized test specimens made from said blend or alloy have alternate bending strengths of more than 1,000,000 cycles at 23° C.

2. A polyamide blend or alloy according to claim 1, wherein said transparent colorless amorphous homopolyamide comprises unbranched long chain aliphatic units having from 8 to 12 carbon atoms and cycloaliphatic units having at least one cyclohexane ring.

3. A polyamide blend or alloy according to claim 1, wherein said transparent colorless amorphous homopolyamide consists essentially of bis-(3-methyl-4-aminocyclohexyl)alkane wherein said alkane has 1 to 3 carbon atoms, and said at least one unbranched aliphatic dicarboxylic acid having 8 to 14 carbon atoms.

4. A polyamide blend or alloy according to claim 1, wherein said at least one cycloaliphatic diamine consists essentially of bis-(3-methyl-4-amino-cyclohexyl-)methane, said at least one unbranched aliphatic dicarboxylic acid consists essentially of dodecanedioic acid, and said copolyamide comprises PA 12/MACMI.

5. A polyamide blend or alloy according to claim 1, wherein said cycloaliphatic diamine is bis-(3-methyl-4-amino-cyclohexyl-)methane.

6. A polyamide blend or alloy according to claim 1, wherein said cycloaliphatic diamine consists essentially of bis-(3-methyl-4-amino-cyclohexyl-)methane.

7. A polyamide blend or alloy according to claim 1, wherein said unbranched aliphatic dicarboxylic acid is selected from the group consisting of octanedioic acid, nonanedioic acid, decanedioic acid, undecanedioic acid and dodecanedioic acid.

8. A polyamide blend or alloy according to claim 1, wherein at least one said optional additive is present and is selected from the group consisting of lubricants, heat and UV stabilizers, chain regulators, pigments, colorants, impact strength modifiers; flame retardants, reinforcing agents and fillers.

9. A polyamide blend or alloy according to claim 1, wherein said copolyamide is selected from the group consisting of PA 12/MACMI, PA 12/MACMI/MACMT, PA 12/PACMI, PA 12/PACPI, PA 12/TCDI, PA 12/IPDI and PA 12/BNI.

10. A molded article formed from a blend or alloy in accordance with claim 1.

11. A molded article formed from a blend or alloy in accordance with claim 2.

12. A molded article formed from a blend or alloy in accordance with claim 3.

13. A molded article formed from a blend or alloy in accordance with claim 4.

14. A molded article formed from a blend or alloy in accordance with claim 5.

15. A molded article formed from a blend or alloy in accordance with claim 6.

16. A molded article formed from a blend or alloy in accordance with claim 7.

17. A molded article formed from a blend or alloy in accordance with claim 8.

18. A molded article formed from a blend or alloy in accordance with claim 9.

* * * * *